US011105606B2

(12) United States Patent
Xu et al.

(10) Patent No.: US 11,105,606 B2
(45) Date of Patent: Aug. 31, 2021

(54) WHEEL FLANGE HEIGHT DIFFERENCE DETECTION AND ANNULAR GROOVE BURR CLEARING DEVICE

(71) Applicant: CITIC Dicastal CO., LTD., Hebei (CN)

(72) Inventors: Zuo Xu, Qinhuangdao (CN); Guoyuan Xiong, Qinhuangdao (CN); Huiying Liu, Qinhuangdao (CN); Yuexin Lu, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 0 days.

(21) Appl. No.: 16/743,353

(22) Filed: Jan. 15, 2020

(65) Prior Publication Data

US 2020/0149861 A1 May 14, 2020

Related U.S. Application Data

(63) Continuation of application No. 15/887,121, filed on Feb. 2, 2018, now abandoned.

(30) Foreign Application Priority Data

Dec. 22, 2017 (CN) .......................... 201711402516.9

(51) Int. Cl.
  *G01B 5/00* (2006.01)
  *G01B 5/20* (2006.01)
  *G01B 3/00* (2006.01)
  *G01B 5/207* (2006.01)
  *B22D 11/126* (2006.01)

(52) U.S. Cl.
  CPC ............ *G01B 5/20* (2013.01); *B22D 11/1265* (2013.01); *G01B 3/002* (2013.01); *G01B 5/0025* (2013.01); *G01B 5/201* (2013.01); *G01B 5/207* (2013.01)

(58) Field of Classification Search
  CPC ........ G01B 5/20; G01B 5/0025; G01B 5/201; G01B 5/207; B23B 11/1265
  USPC ...................................... 33/203.12
  See application file for complete search history.

(56) References Cited

U.S. PATENT DOCUMENTS

| 10,232,454 | B2 * | 3/2019 | Liu | .................. B22D 11/126 |
| 10,399,160 | B2 * | 9/2019 | Liu | .................. B23Q 5/36 |
| 10,434,620 | B2 * | 10/2019 | Liu | .................. B24B 27/003 |
| 10,436,565 | B2 | 10/2019 | Liu et al. | |
| 10,436,568 | B2 * | 10/2019 | Liu | .................. G01B 5/207 |
| 10,518,389 | B2 * | 12/2019 | Liu | .................. B24B 29/005 |
| 10,569,378 | B2 * | 2/2020 | Liu | .................. B24B 9/04 |
| 10,625,388 | B2 * | 4/2020 | Liu | .................. B23B 5/00 |
| 10,953,512 | B2 * | 3/2021 | Liu | .................. B23B 5/00 |
| 2009/0067940 | A1 | 3/2009 | Arai et al. | |
| 2019/0025039 | A1 | 1/2019 | Liu et al. | |

(Continued)

FOREIGN PATENT DOCUMENTS

| CN | 104776823 A | 7/2015 |
| CN | 105881138 A | 8/2016 |

(Continued)

*Primary Examiner* — Christopher W Fulton
(74) *Attorney, Agent, or Firm* — Cooper Legal Group, LLC

(57) ABSTRACT

A wheel flange height difference detection and annular groove burr clearing device includes a turntable, a detection platform, a first intelligent compression meter, a second intelligent compression meter, a first burr cutter, a second burr cutter and the like.

3 Claims, 5 Drawing Sheets

(56) References Cited

U.S. PATENT DOCUMENTS

| | | | |
|---|---|---|---|
| 2019/0063896 A1* | 2/2019 | Liu | G01B 5/207 |
| 2019/0193234 A1* | 6/2019 | Xue | B24B 5/44 |
| 2019/0195611 A1 | 6/2019 | Liu et al. | |
| 2019/0202019 A1 | 7/2019 | Liu et al. | |
| 2019/0202020 A1 | 7/2019 | Liu et al. | |
| 2019/0202034 A1 | 7/2019 | Liu et al. | |
| 2019/0204060 A1 | 7/2019 | Liu et al. | |
| 2020/0139501 A1* | 5/2020 | Li | B24B 5/44 |

FOREIGN PATENT DOCUMENTS

| | | | |
|---|---|---|---|
| CN | 106091874 A | 11/2016 | |
| CN | 106840069 A | 6/2017 | |
| CN | 107283000 A | 10/2017 | |
| CN | 107300354 A | 10/2017 | |
| CN | 107356192 A | 11/2017 | |
| CN | 207585512 U | 7/2018 | |
| EP | 3542955 A2 * | 9/2019 | B24B 5/44 |

* cited by examiner

WHEEL FLANGE HEIGHT DIFFERENCE DETECTION AND ANNULAR GROOVE BURR CLEARING DEVICE

CROSS-REFERENCE TO RELATED APPLICATIONS

The present application is a continuation of U.S. patent application Ser. No. 15/887,121, filed on Feb. 2, 2018, now abandoned, which claims priority to Chinese Patent Application No. 201711402516.9, filed on Dec. 22, 2017. The entire disclosures of the above applications are incorporated herein by reference.

BACKGROUND

A wheel flange face involves in mounting of a wheel, it needs to strictly control the flatness of a flange, as for a wheel having a flange annular groove structure, it also needs to strictly control the height difference between the inner ring and the outer ring of the flange, and the outer ring is generally required to be 0.15±0.05 mm higher than the inner ring. At present, equipment for 100% automatically detecting the height difference of a flange lacks in actual production, and only a three-coordinate measuring machine is adopted for spot check, so the efficiency is low, the reliability is poor, and batches of rejects are easily produced. Moreover, tiny burrs are formed on two sides of the annular groove structure in the circumferential direction, and if the burrs are not cleared in time, a great risk of corrosion exists. The burrs are mostly manually cleared at present, so that the uniformity and the roundness are poor, the depth is not identical, and the flange face can be easily scratched. Based on the current situation, the present patent provides a wheel flange height difference detection and annular groove burr clearing device. By ordered engagement and integration on height difference detection of the inner ring and the outer ring of a wheel flange and clearing of annular groove burrs, not only 100% automatic detection is realized, but also burrs are removed from two sides of an annular groove with high precision.

SUMMARY

The present disclosure relates to the technical field of wheel detection and burr removal, and specifically, to a wheel flange height difference detection and annular groove burr clearing device.

The object of the present disclosure is to provide a wheel flange height difference detection and annular groove burr clearing device, which can be used for automatic continuous production, not only realizes 100% automatic detection on the height difference of a flange, but also can remove burrs from two sides of an annular groove with high precision.

In order to fulfill the above object, the technical solution of the present disclosure proposes a wheel flange height difference detection and annular groove burr clearing device. The device includes a frame, a bottom support plate, a servo motor, a shaft, a bearing seat, a bearing, a turntable, a fifth cylinder, a guide post, a detection platform, first guide rails, a first cylinder, a first sliding block, a second sliding block, a second cylinder, a first intelligent compression meter, a second intelligent compression meter, a sixth cylinder, a seventh cylinder, a first feeding platform, a second feeding platform, a second guide rail, a third cylinder, a third sliding block, a third guide rail, a fourth sliding block, a fourth cylinder, a first burr cutter, a second burr cutter, axial positioning blocks, radial positioning blocks and corner cylinder pressure claws.

The wheel flange height difference detection and annular groove burr clearing device includes three systems, i.e., a wheel positioning and clamping system, a flange height difference measuring system and a flange annular groove burr clearing system.

An annular workbench is mounted at the top of the frame, the three axial positioning blocks are annularly distributed at intervals of 120 degrees, the three radial positioning blocks are annularly distributed at intervals of 120 degrees, and a corner cylinder pressure claw is mounted on each axial positioning block. A manipulator puts a wheel onto the annular workbench, the axial positioning blocks axially position the wheel, the three radial positioning blocks simultaneously move to the center to radially position the wheel, and then the corner cylinder pressure claws are started to clamp the wheel. This is the wheel positioning and clamping system.

The bottom support plate is fixed on the frame, the servo motor is mounted on the bottom support plate, and the output end of the motor is connected with the turntable by the shaft to control the turntable to rotate. The fifth cylinder is mounted at a first end of the turntable by a support, the detection platform is mounted at the output end of the fifth cylinder, and the fifth cylinder controls the detection platform to ascend and descend under the guidance of the guide post. The two first guide rails are fixed on the detection platform, the first cylinder is mounted at a first end of the detection platform by a support plate, the output end of the first cylinder is connected with the first sliding block, the first sliding block is mounted on the first guide rails, and the first intelligent compression meter is mounted on the first sliding block; the second cylinder is mounted at a second end of the detection platform by a support plate, the output end of the second cylinder is connected with the second sliding block, the second sliding block is also mounted on the first guide rails, and the second intelligent compression meter is mounted on the second sliding block. The horizontal positions of the first intelligent compression meter and the second intelligent compression meter can be adjusted by the first cylinder and the second cylinder, so that the hand of the first intelligent compression meter is located directly below the outer ring of a flange, and the hand of the second intelligent compression meter is located directly below the inner ring of the flange. The hands of the first intelligent compression meter and the second intelligent compression meter have equal height, and the fifth cylinder drives the detection platform to ascend a rated height, so that the hands of the first intelligent compression meter and the second intelligent compression meter are compressed; the outer ring of the wheel flange is high and the inner ring is low, the compression amounts of the hands are different when the hands having equal height ascend the same rated height, the distance from the hand of the first intelligent compression meter to the outer ring of the flange is short, so the compression amount is large, while the distance from the hand of the second intelligent compression meter to the inner ring of the flange is long, so the compression amount is small. The numerical difference measured by the first intelligent compression meter and the second intelligent compression meter is the height difference between the outer ring and the inner ring of the flange. This is the flange height difference measuring system.

The sixth cylinder and the seventh cylinder are mounted at a second end of the turntable by supports, the output end of the sixth cylinder is connected with the first feeding platform to control the first feeding platform to ascend and descend, the second guide rail and the third cylinder are mounted on the first feeding platform, the output end of the third cylinder is connected with the third sliding block, the third sliding block is mounted on the second guide rail, and the first burr cutter is mounted on the third sliding block. The output end of the seventh cylinder is connected with the second feeding platform to control the second feeding platform to ascend and descend, the third guide rail and the fourth cylinder are mounted on the second feeding platform, the output end of the fourth cylinder is connected with the fourth sliding block, the fourth sliding block is mounted on the third guide rail, and the second burr cutter is mounted on the fourth sliding block. The horizontal positions of the first burr cutter and the second burr cutter II can be adjusted by the third cylinder and the fourth cylinder, so that the first burr cutter is located directly below burrs on the outer ring of an annular groove, and the second burr cutter is located directly below burrs on the inner ring of the annular groove. In an initial state, the first burr cutter and the second burr cutter have equal height, and are as high as the hands of the first intelligent compression meter and the second intelligent compression meter. After the height difference of the flange is measured, the value of subtracting the measured value of the first intelligent compression meter from the ascending rated height of the detection platform is the height from the first burr cutter to the burrs on the outer ring of the annular groove, the value is fed back to the sixth cylinder, the sixth cylinder drives the first burr cutter according to the value to feed upwards, the cutting edge accurately arrives at the burr position, and the burrs are removed from the outer ring of the annular groove with high precision; and the value of subtracting the measured value of the second intelligent compression meter from the ascending rated height of the detection platform is the height from the second burr cutter to the burrs on the inner ring of the annular groove, the value is fed back to the seventh cylinder, the seventh cylinder drives the second burr cutter according to the value to feed upwards, the cutting edge accurately arrives at the burr position, and the burrs are removed from the inner ring of the annular groove with high precision. This is the flange annular groove burr clearing system.

The working process of the wheel flange height difference detection and annular groove burr clearing device is: firstly, according to a produced wheel, the horizontal positions of the first intelligent compression meter and the second intelligent compression meter are adjusted by the first cylinder and the second cylinder, so that the hand of the first intelligent compression meter is located directly below the outer ring of a flange, and the hand of the second intelligent compression meter is located directly below the inner ring of the flange. The horizontal positions of the first burr cutter and the second burr cutter are adjusted by the third cylinder and the fourth cylinder, so that the first burr cutter is located directly below burrs on the outer ring of an annular groove, and the second burr cutter is located directly below burrs on the inner ring of the annular groove. The position of a valve hole can be foreknown by previous valve hole positioning, and according to the included angle between the valve hole and a bolt hole, the servo motor is started to adjust the initial circumferential positions of the intelligent meters to avoid a flange drainage channel. Then, the manipulator puts the wheel onto the annular workbench, the axial positioning blocks axially position the wheel, the three radial positioning blocks simultaneously move to the center to radially position the wheel, and the corner cylinder pressure claws are started to clamp the wheel. Next, the flange height difference measuring system is started, the fifth cylinder drives the detection platform to ascend by a rated height, the hands of the first intelligent compression meter and the second intelligent compression meter are compressed, the numerical difference measured by the first intelligent compression meter and the second intelligent compression meter is the height difference between the outer ring and the inner ring of the flange, and the difference is compared with the value required by a drawing to judge the qualification. After the height difference of the flange is measured, the two intelligent meters descend and are reset, the value of subtracting the measured value of the first intelligent compression meter from the ascending rated height of the detection platform is fed back to the sixth cylinder, the sixth cylinder drives the first burr cutter according to the value to feed upwards, and the cutting edge accurately arrives at the burr position; the value of subtracting the measured value of the second intelligent compression meter from the ascending rated height of the detection platform is fed back to the seventh cylinder, the seventh cylinder drives the second burr cutter according to the value to feed upwards, and the cutting edge accurately arrives at the burr position; and finally, the servo motor drives the cutters to rotate a cycle around the center of the wheel, thus removing the burrs from the inner ring and the outer ring of the annular groove with high precision.

By the device, height difference detection on the inner ring and the outer ring of the wheel flange and clearing of annular groove burrs are orderly engaged and integrated, the position of burrs are found while the height difference is measured, closed-loop control is realized in measurement and burr removal, and the burr cutters can accurately arrive at the burr areas according to the difference of the height difference of each wheel flange, so that specific analysis of specific problems is realized, the problem of low single feeding precision is avoided, 100% automatic detection is realized, and the burrs are removed from the two sides of the annular groove with high precision; and the device is skillful in layout, novel in structure and advanced in technology.

LIST OF REFERENCE NUMERALS

Figure 1:
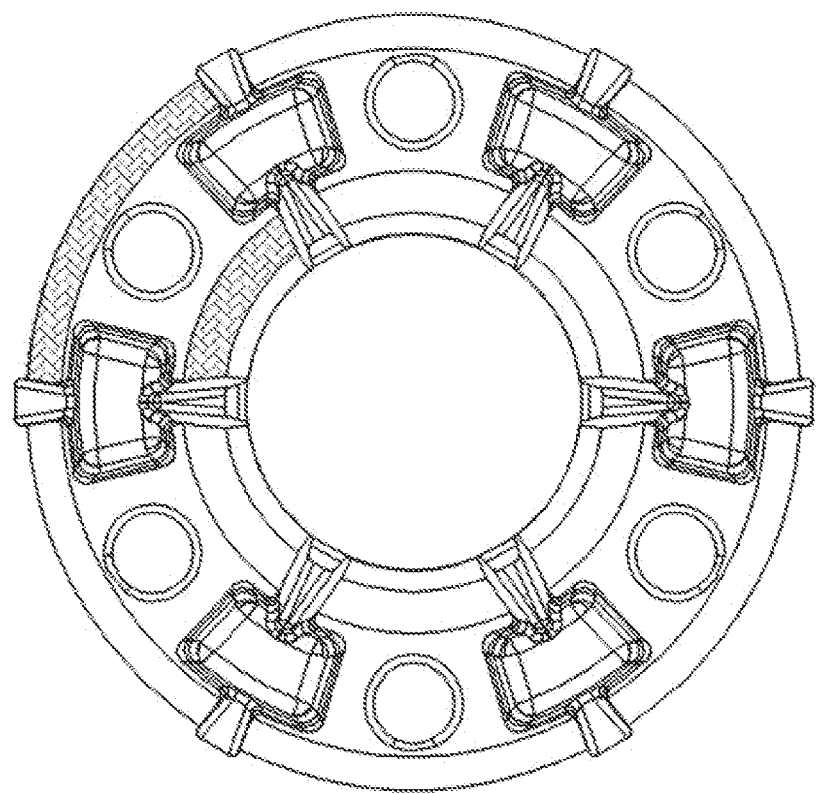
FIG. 1 is a structural schematic diagram of an annular groove of a wheel flange.
Figure 2:
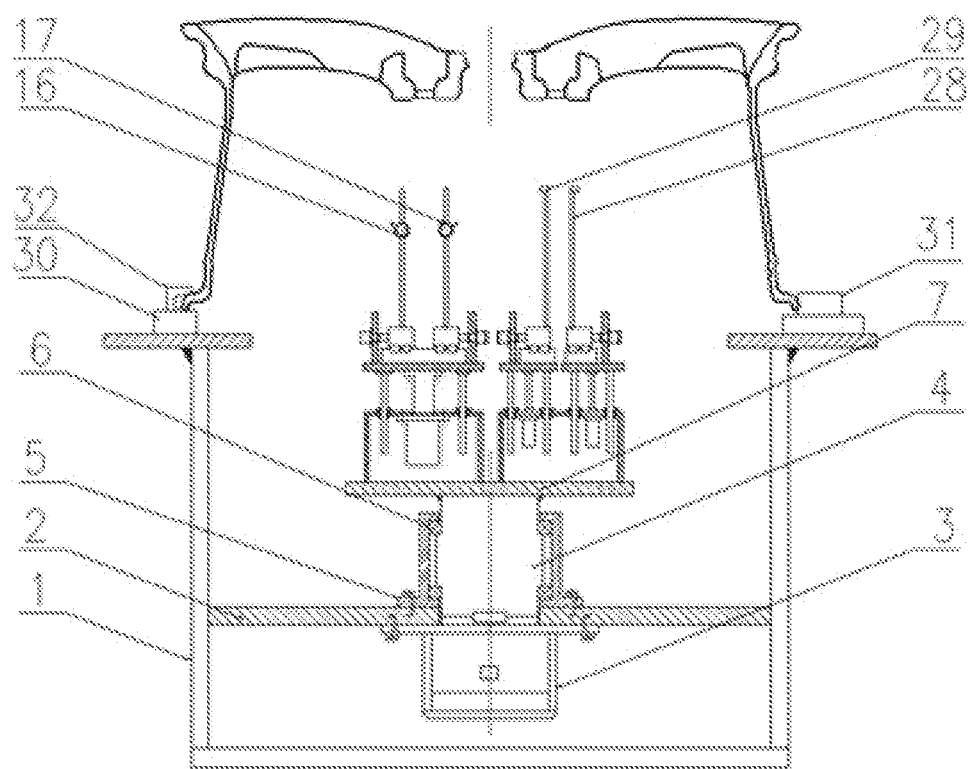
FIG. 2 is a front view of a wheel flange height difference detection and annular groove burr clearing device of the present disclosure.
Figure 3:
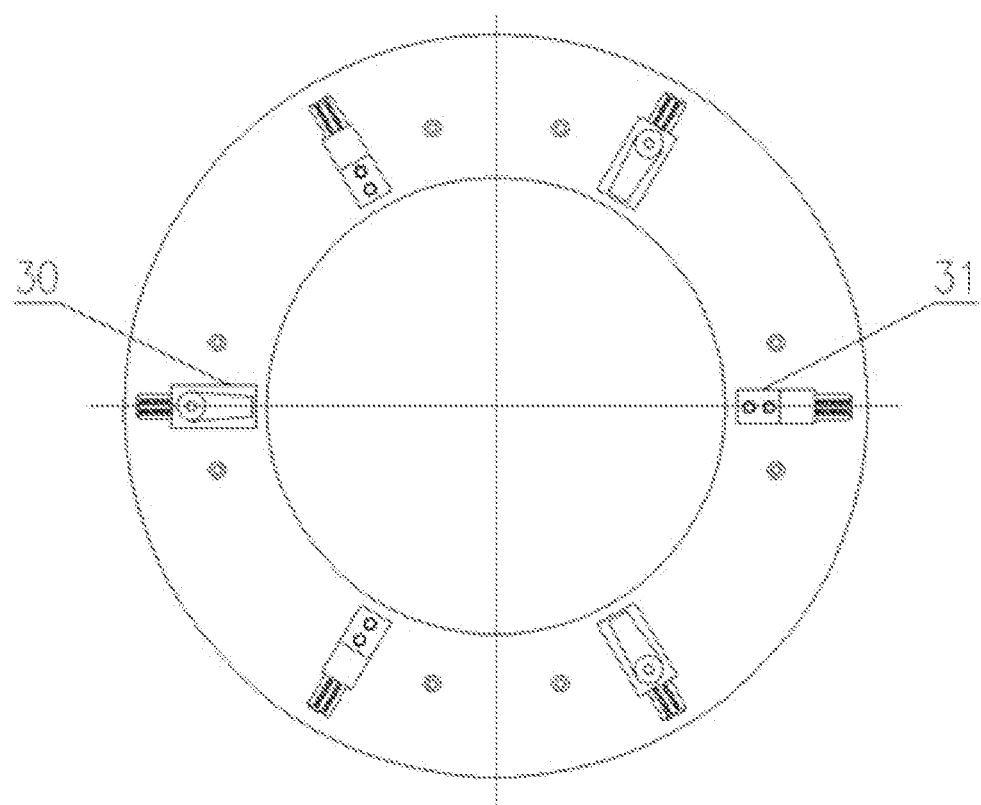
FIG. 3 is a top view of the wheel flange height difference detection and annular groove burr clearing device of the present disclosure.
Figure 4:
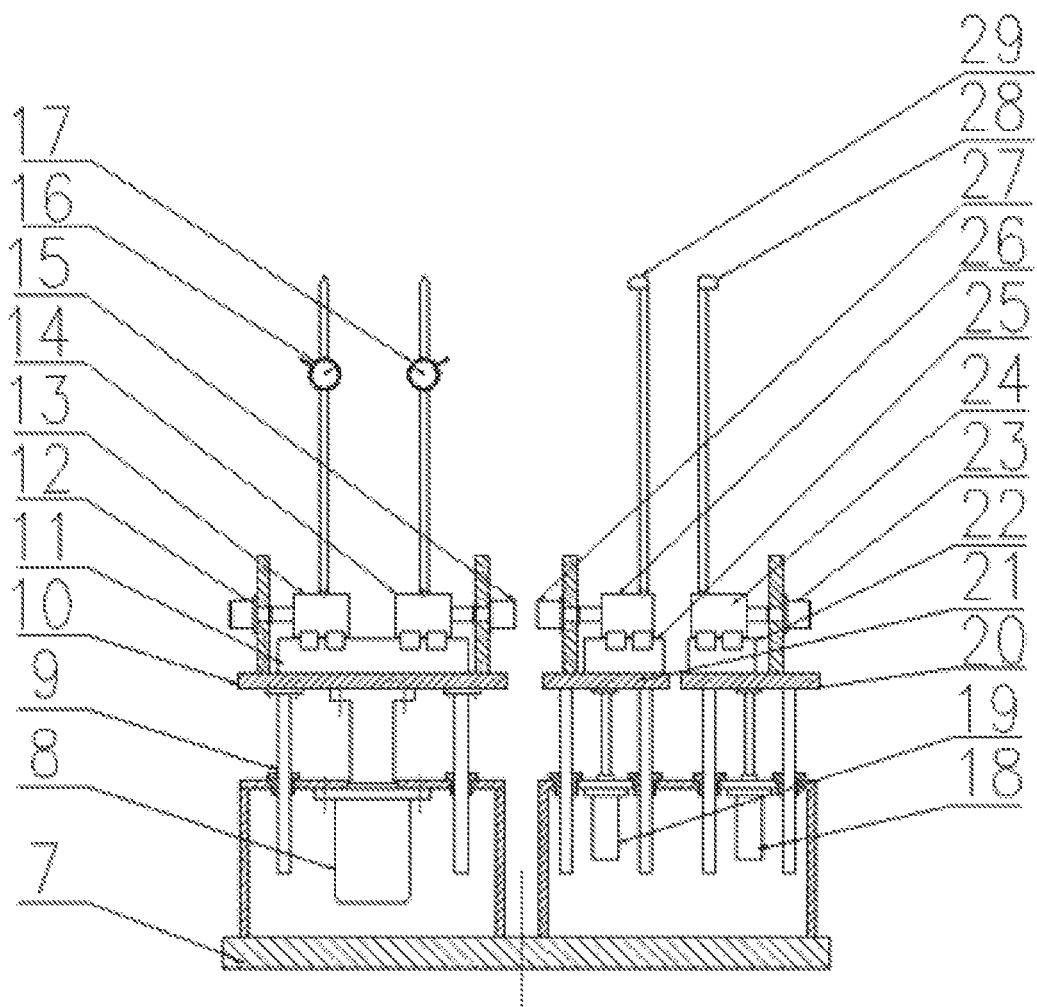
FIG. 4 is an enlarged front view of a detection and burr removing system of the wheel flange height difference detection and annular groove burr clearing device of the present disclosure.
Figure 5:
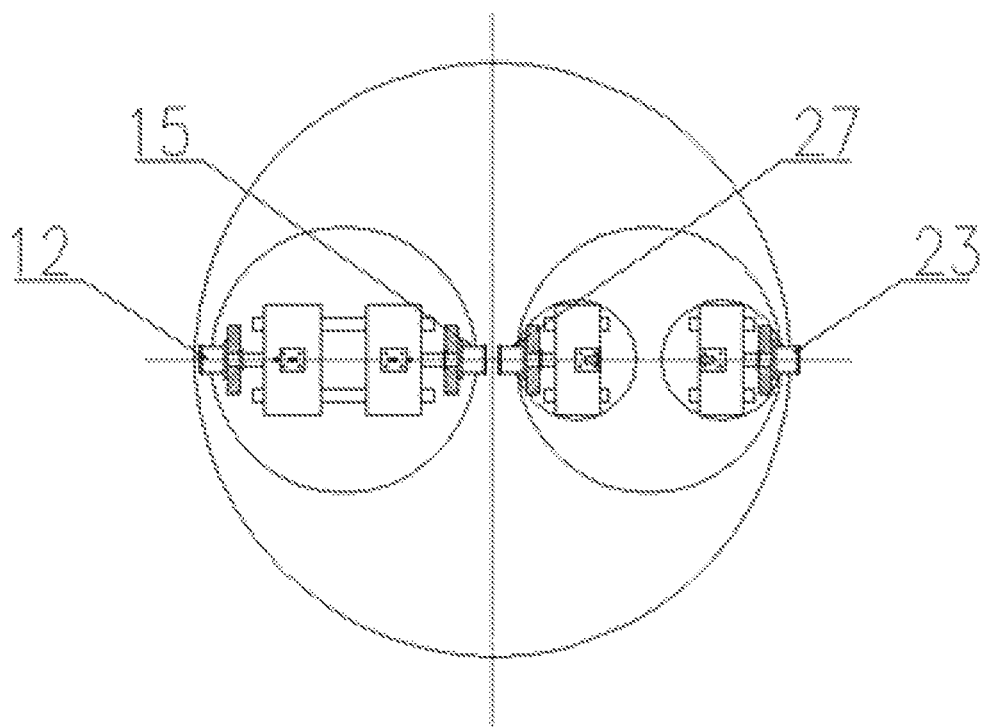
FIG. 5 is an enlarged top view of the detection and burr removing system of the wheel flange height difference detection and annular groove burr clearing device of the present disclosure.

1—frame, 2—bottom support plate, 3—servo motor, 4—shaft, 5—bearing seat, 6—bearing, 7—turntable, 8—fifth cylinder, 9—guide post, 10—detection platform, 11—first guide rail, 12—first cylinder, 13—first sliding block, 14—second sliding block, 15—second cylinder, 16—first intelligent compression meter, 17—second intelligent compression meter, 18—sixth cylinder, 19—seventh cylinder, 20—first feeding platform, 21—second feeding platform, 22—second guide rail, 23—third cylinder, 24—third sliding block, 25—third guide rail, 26—fourth sliding block, 27—fourth cylinder, 28—first burr cutter, 29—second burr cutter, 30—axial positioning block, 31—radial positioning block, 32—corner cylinder pressure claw.

DETAILED DESCRIPTION

Specific details and working conditions of a device provided by the present disclosure will be given below in combination with the description of drawings.

A wheel flange height difference detection and annular groove burr clearing device includes a frame 1, a bottom support plate 2, a servo motor 3, a shaft 4, a bearing seat 5, a bearing 6, a turntable 7, a fifth cylinder 8, a guide post 9, a detection platform 10, first guide rails 11, a first cylinder 12, a first sliding block 13, a second sliding block 14, a second cylinder 15, a first intelligent compression meter 16, a second intelligent compression meter 17, a sixth cylinder 18, a seventh cylinder 19, a first feeding platform 20, a second feeding platform 21, a second guide rail 22, a third cylinder 23, a third sliding block 24, a third guide rail 25, a fourth sliding block 26, a fourth cylinder 27, a first burr cutter 28, a second burr cutter 29, axial positioning blocks 30, radial positioning blocks 31 and corner cylinder pressure claws 32.

The wheel flange height difference detection and annular groove burr clearing device includes three systems, i.e., a wheel positioning and clamping system, a flange height difference measuring system and a flange annular groove burr clearing system.

An annular workbench is mounted at the top of the frame 1, the three axial positioning blocks 30 are annularly distributed at intervals of 120 degrees, the three radial positioning blocks 31 are annularly distributed at intervals of 120 degrees, and a corner cylinder pressure claw 32 is mounted on each axial positioning block 30. A manipulator puts a wheel onto the annular workbench, the axial positioning blocks 30 axially position the wheel, the three radial positioning blocks 31 simultaneously move to the center to radially position the wheel, and then the corner cylinder pressure claws 32 are started to clamp the wheel. This is the wheel positioning and clamping system.

The bottom support plate 2 is fixed on the frame 1, the servo motor 3 is mounted on the bottom support plate 2, and the output end of the motor is connected with the turntable 7 by the shaft 4 to control the turntable 7 to rotate. The fifth cylinder 8 is mounted at a first end of the turntable 7 by a support, the detection platform 10 is mounted at the output end of the fifth cylinder 8, and the fifth cylinder 8 controls the detection platform 10 to ascend and descend under the guidance of the guide post 9. The two first guide rails 11 are fixed on the detection platform 10, the first cylinder 12 is mounted at a first end of the detection platform 10 by a support plate, the output end of the first cylinder 12 is connected with the first sliding block 13, the first sliding block 13 is mounted on the first guide rails 11, and the first intelligent compression meter 16 is mounted on the first sliding block 13; the second cylinder 15 is mounted at a second end of the detection platform 10 by a support plate, the output end of the second cylinder 15 is connected with the second sliding block 14, the second sliding block 14 is also mounted on the first guide rails 11, and the second intelligent compression meter 17 is mounted on the second sliding block 14. The horizontal positions of the first intelligent compression meter 16 and the second intelligent compression meter 17 can be adjusted by the first cylinder 12 and the second cylinder 15, so that the hand of the first intelligent compression meter 16 is located directly below the outer ring of a flange, and the hand of the second intelligent compression meter 17 is located directly below the inner ring of the flange. The hands of the first intelligent compression meter 16 and the second intelligent compression meter 17 have equal height, and the fifth cylinder 8 drives the detection platform 10 to ascend a rated height, so that the hands of the first intelligent compression meter 16 and the second intelligent compression meter 17 are compressed; the outer ring of the wheel flange is high and the inner ring is low, the compression amounts of the hands are different when the hands having equal height ascend the same rated height, the distance from the hand of the first intelligent compression meter 16 to the outer ring of the flange is short, so the compression amount is large, while the distance from the hand of the second intelligent compression meter 17 to the inner ring of the flange is long, so the compression amount is small. The numerical difference measured by the first intelligent compression meter 16 and the second intelligent compression meter 17 is the height difference between the outer ring and the inner ring of the flange. This is the flange height difference measuring system.

The sixth cylinder 18 and the seventh cylinder 19 are mounted at a second end of the turntable 7 by supports, the output end of the sixth cylinder 18 is connected with the first feeding platform 20 to control the first feeding platform 20 to ascend and descend, the second guide rail 22 and the third cylinder 23 are mounted on the first feeding platform 20, the output end of the third cylinder 23 is connected with the third sliding block 24, the third sliding block 24 is mounted on the second guide rail 22, and the first burr cutter 28 is mounted on the third sliding block 24. The output end of the seventh cylinder 19 is connected with the second feeding platform 21 to control the second feeding platform 21 to ascend and descend, the third guide rail 25 and the fourth cylinder 27 are mounted on the second feeding platform 21, the output end of the fourth cylinder 27 is connected with the fourth sliding block 26, the fourth sliding block 26 is mounted on the third guide rail 25, and the second burr cutter 29 is mounted on the fourth sliding block 26. The horizontal positions of the first burr cutter 28 and the second burr cutter 29 can be adjusted by the third cylinder 23 and the fourth cylinder 27, so that the first burr cutter 28 is located directly below burrs on the outer ring of an annular groove, and the second burr cutter 29 is located directly below burrs on the inner ring of the annular groove. In an initial state, the first burr cutter 28 and the second burr cutter 29 have equal height, and are as high as the hands of the first intelligent compression meter 16 and the second intelligent compression meter 17. After the height difference of the flange is measured, the value of subtracting the measured value of the first intelligent compression meter 16 from the ascending rated height of the detection platform 10 is the height from the first burr cutter 28 to the burrs on the outer ring of the annular groove, the value is fed back to the sixth cylinder 18, the sixth cylinder 18 drives the first burr cutter 28 according to the value to feed upwards, the cutting edge accurately arrives at the burr position, and the burrs are removed from the outer ring of the annular groove with high precision; and the value of subtracting the measured value of the second intelligent compression meter 17 from the ascending rated height of the detection platform 10 is the height from the second burr cutter 29 to the burrs on the inner ring of the annular groove, the value is fed back to the seventh cylinder 19, the seventh cylinder 19 drives the second burr cutter 29 according to the value to feed upwards, the cutting edge accurately arrives at the burr position, and the burrs are removed from the inner ring of the annular groove with high precision. This is the flange annular groove burr clearing system.

The working process of the wheel flange height difference detection and annular groove burr clearing device is: firstly, according to a produced wheel, the horizontal positions of the first intelligent compression meter 16 and the second intelligent compression meter 17 are adjusted by the first cylinder 12 and the second cylinder 15, so that the hand of the first intelligent compression meter 16 is located directly below the outer ring of a flange, and the hand of the second intelligent compression meter 17 is located directly below the inner ring of the flange. The horizontal positions of the first burr cutter 28 and the second burr cutter 29 are adjusted by the third cylinder 23 and the fourth cylinder 27, so that the first burr cutter 28 is located directly below burrs on the outer ring of an annular groove, and the second burr cutter 29 is located directly below burrs on the inner ring of the annular groove. The position of a valve hole can be foreknown by previous valve hole positioning, and according to the included angle between the valve hole and a bolt hole, the servo motor 3 is started to adjust the initial circumferential positions of the intelligent meters to avoid a flange drainage channel. Then, the manipulator puts the wheel onto the annular workbench, the axial positioning blocks 30 axially position the wheel, the three radial positioning blocks 31 simultaneously move to the center to radially position the wheel, and the corner cylinder pressure claws 32 are started to clamp the wheel. Next, the flange height difference measuring system is started, the fifth cylinder 8 drives the detection platform 10 to ascend by a rated height, the hands of the first intelligent compression meter 16 and the second intelligent compression meter 17 are compressed, the numerical difference measured by the first intelligent compression meter 16 and the second intelligent compression meter 17 is the height difference between the outer ring and the inner ring of the flange, and the difference is compared with the value required by a drawing to judge the qualification. After the height difference of the flange is measured, the two intelligent meters descend and are reset, the value of subtracting the measured value of the first intelligent compression meter 16 from the ascending rated height of the detection platform 10 is fed back to the sixth cylinder 18, the sixth cylinder 18 drives the first burr cutter 28 according to the value to feed upwards, and the cutting edge accurately arrives at the burr position; the value of subtracting the measured value of the second intelligent compression meter 17 from the ascending rated height of the detection platform 10 is fed back to the seventh cylinder 19, the seventh cylinder 19 drives the second burr cutter 29 according to the value to feed upwards, and the cutting edge accurately arrives at the burr position; and finally, the servo motor 3 drives the cutters to rotate a cycle around the center of the wheel, thus removing the burrs from the inner ring and the outer ring of the annular groove with high precision.

By the device, height difference detection on the inner ring and the outer ring of the wheel flange and clearing of annular groove burrs are orderly engaged and integrated, the position of burrs are found while the height difference is measured, closed-loop control is realized in measurement and burr removal, and the burr cutters can accurately arrive at the burr areas according to the difference of the height difference of each wheel flange, so that specific analysis of specific problems is realized, the problem of low single feeding precision is avoided, 100% automatic detection is realized, and the burrs are removed from the two sides of the annular groove with high precision; and the device is skillful in layout, novel in structure and advanced in technology.

The invention claimed is:

1. A wheel flange height difference detection and annular groove burr clearing device, comprising a frame, a bottom support plate, a servo motor, a shaft, a bearing seat, a bearing, a turntable, a guide post, a detection platform, first guide rails, a first cylinder, a first sliding block, a second sliding block, a second cylinder, a first intelligent compression meter, a second intelligent compression meter, a first feeding platform, a second feeding platform, a second guide rail, a third cylinder, a third sliding block, a third guide rail, a fourth sliding block, a fourth cylinder, a fifth cylinder, a sixth cylinder, a seventh cylinder, a first burr cutter, a second burr cutter, axial positioning blocks, radial positioning blocks and corner cylinder pressure claws; characterized in that: the horizontal positions of the first intelligent compression meter and the second intelligent compression meter can be adjusted by the first cylinder and the second cylinder, so that the hand of the first intelligent compression meter is located directly below the outer ring of a flange, and the hand of the second intelligent compression meter is located directly below the inner ring of the flange; the horizontal positions of the first burr cutter and the second burr cutter can be adjusted by the third cylinder and the fourth cylinder, so that the first burr cutter is located directly below burrs on the outer ring of an annular groove, and the second burr cutter is located directly below burrs on the inner ring of the annular groove; and in an initial state, the first burr cutter and the second burr cutter have equal height, and are as high as the hands of the first intelligent compression meter and the second intelligent compression meter.

2. The wheel flange height difference detection and annular groove burr clearing device according to claim 1, characterized in that the fifth cylinder drives the detection platform to ascend by a rated height, so that the hands of the first intelligent compression meter and the second intelligent compression meter are compressed; and the numerical difference measured by the first intelligent compression meter and the second intelligent compression meter is the height difference between the outer ring and the inner ring of the flange.

3. The wheel flange height difference detection and annular groove burr clearing device according to claim 1, characterized in that the value of subtracting the measured value of the first intelligent compression meter from the ascending rated height of the detection platform is fed back to the sixth cylinder, the sixth cylinder, according to the value, drives the first burr cutter to feed upwards, the value of subtracting the measured value of the second intelligent compression meter from the ascending rated height of the detection platform is fed back to the seventh cylinder, and the seventh cylinder drives the second burr cutter according to the value to feed upwards.

\* \* \* \* \*